United States Patent Office 3,814,766
Patented June 4, 1974

---

3,814,766
11-DEOXOGLYCYRRHETINIC ACID PIPERAZIDES USEFUL AS ANTIULCER AGENTS
Hans-Jurgen E. Hess, Old Lyme, and Roger P. Nelson, Waterford, Conn., assignors to Pfizer Inc., New York, N.Y.
No Drawing. Filed Nov. 3, 1971, Ser. No. 195,495
Int. Cl. C07d 51/70
U.S. Cl. 260—268 PC    8 Claims

ABSTRACT OF THE DISCLOSURE

Amide derivatives of 11-deoxoglycyrrhetinic acid and its 3-alkanoyl derivatives where in the amide is derived from ammonia, an alkanolamine, a dialkanolamine, an ω-hydroxyalkyl alkylene diamine, an ω-[bis(hydroxyalkyl)]alkylene diamine, a cyclic amine, a primary or secondary alkylamine or an amino acid are useful as antiulcer agents.

BACKGROUND OF THE INVENTION

This invention relates to novel derivatives of glycyrrhetinic acid and to their use as antiulcer agents. More specifically, it relates to amide derivatives of 11-deoxoglycyrrhetinic acid and its 3-alkanoyl derivatives which are useful antiulcer agents wherein the amide is derived from ammonia, an alkanolamide, a dialkanolamine, a cyclic amine, a primary or secondary amine, an ω-hydroxyalkyl alkylene diamine, an ω-[bis(hydroxyalkyl)]-alkylene diamine, or an amino acid.

Chronic gastric and duodenal ulcers, collectively known as peptice ulcers, are a common affliction for which a variety of treatments have been developed. The treatment depends upon the severity of the ulcer and may range from dietary and medical (drug) treatment to surgery. A wide variety of drugs have been used to treat ulcers, the most recent of which to gain widespread attention is carbenoxolone sodium, the disodium salt of the hemisuccinate of glycyrrhetinic acid. It is reported to prevent formation of and to accelerate healing of gastric ulcers in animals, including humans ("Carbenoxolone Sodium: A Sysposium," J. M. Robson and F. M. Sullivan, eds., Butterworths, London, 1968). However, its use is accompanied by undesirable aldosterone-like side effects, such as marked anti-diuretic and sodium-retaining activity, and, oftentimes, potassium loss such that continued therapy with this agent often leads to hypertension, muscle weakness and, ultimately, congestive heart failure.

Carbenoxolone sodium is almost wholly absorbed in the stomach and is not effective against duodenal ulcers except when administered as a specially fomulated capsule which enables its transport to the desired site.

A more effective treatment of peptic ulcers is therefore desirable. One which will effectively act upon ulcers in the duodenum as well as upon gastric ulcers without the need of special formulation and minimizes the aldosterone-like side effects of carbenoxolone is especially desirable.

Glycyrrhetinic acid, esters, 3-acyloxy derivatives, salts and amides thereof are known to exhibit pharmaceutical properties. British Pat. 628,443 (Aug. 14, 1963) reports glycyrrhetinic acid to be an antinflammatory, analgesic and antipyretic agent. U.S. 3,070,623 (Dec. 25, 1962) describes hemi-esters of glycyrrhetinic acid, including the hemi-succinate (also known as carbenoxolone sodium), as anti-inflammatory agents. U.S. 3,070,624 (Dec. 25, 1962) teaches basic esters of the carboxy group at the 20-position of glycyrrhetinic acid which exhibit anti-inflammatory properties and inhibit the action of steroids and steroidal metabolism. Anti-inflammatory and analgesic properties are reported for amino acid salts of glycyrrhetinic acid in Japanese Pat. 32,798/69, published Oct. 27, 1965. French Pat. 215 CAM/5544M, published July 19, 1968, discloses hypoglycemic activity for glycyrrhetinic acid and its methyl ester. Salts of glycyrrhetinic acid and its hemi-esters with aluminum, zinc, bismuth and metals of Groups II-A and VIII of the Periodic Chart of the Elements are reported in Belgian Pat. 628,444, published Feb. 4, 1963, to be of value in treating digestive disorders such as gastric acidosis, inflammation and ulcers.

Amides of glycyrrhetinic acid and its 3-acyl derivatives useful as anti-inflammatory agents are described in a number of patents. Cyclic amides, e.g., the piperazine, N-acylpiperazides, N-carbalkoxypiperazides, are described in Belgian Pat. 753,773, granted July 28, 1969. The N-(lower alkyl)piperazides, piperidide and morpholide are disclosed in Japanese Pat. 26,300/67, published Dec. 13, 1967, (C.A. 69, 44067t, 1968). Additionally, simple amides, e.g., the di(lower alkyl)substituted amides, are described in this Japanese patent. U.S. Pat. 3,412,084 (Nov. 19, 1968) teaches alkyl, cycloalkyl, aralkyl and aryl substituted amides of glycyrrhetinic acid as well as heterocyclic amides thereof all of which are reported to be anti-inflammatory agents of low toxicity. Dialkyl-aminoalkyl substituted amides of glycyrrhetinic acid are described by Adanin et al., Zh. Obshch. Khim. *37*, 1063-65 (1967) (C.A. *68*, 22087q. 1968). Alkylolamine condensates of glycyrrhetinic acid useful as anti-inflammatory agents in cosmetics are reported in Japanese Pat. 8,382/67, published Nov. 4, 1967.

A variety of derivatives of glycyrrhetinic acid and 11-deoxoglycyrrhetinic acid are described by Dean et al., J. Pharm. Pharmac. *19*, 682–9 (1967); including the hemi-succinates of methyl glycyrrhetinate, glycyrrhetinamide and 11-deoxoglycyrrhetinic acid; the 3-acetyl derivatives of glycyrrhetinamido-ortho- and para-benzoic acids; and N - (glycyrrhetinyl)glycine(glycyrrhetinuric acid).

Various derivatives of 11-deoxoglycyrrhetinic acids useful as intermediates are described by Ruzicka et al. in Helv. Chim. Acta *20*, 1271 (1937) and *22*, 197 (1939); Corey et al., J. Am. Chem. Soc. *81*, 1745 (1959) and Drefahl et al., Ber. *94*, 2015 (1961): the acetyl-, the methyl ester, the acetyl acid chloride, the acetyl methyl ester, the acetyl azide and the acetyl amide.

Groen et al., Acta. Med. Scand. Suppl. *312*, 745–748 (1956) in a comparative study of the pharmacological activity of the adrenocortical streoids and glycyrrhetinic acid noted that in order to retain activity in either class of compounds only a limited degree of structural variation is possible. They noted that "the activity seemed dependent on the presence of an 11-keto group." Vinogradov et al., Khim. v Estestn. Naukaki Sb. 40–6, 1965 (C.A. *65*, 6136c, 1966) report the methyl ester of 11-deoxoglycyrrhetinic acid gave rise to a sharp increase in the excretion of water and sodium by the kidneys in dogs. In rats, 11-deoxoglycyrrhetinic relieved the action of deoxycorticosterone.

SUMMARY OF THE INVENTION

It has now been found that 11-deoxoglycyrrhetinic acid amides of the formulae below are effective antiulcer agents:

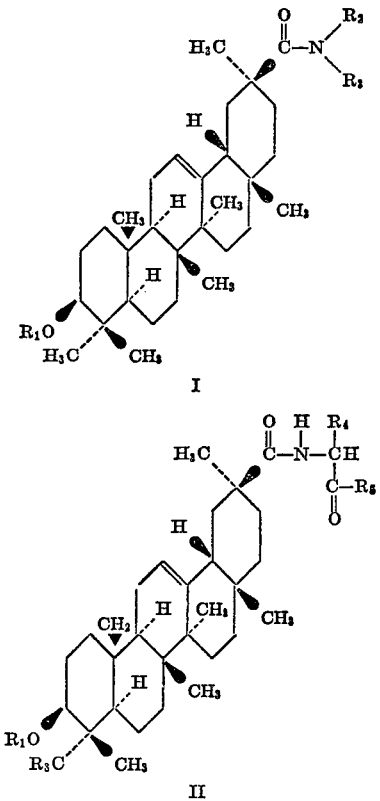

I

II wherein $R_1$ is selected from the group consisting of hydrogen, alkanoyl having from two to six carbon atoms, ω-carboxyalkanoyl having a total of from four to five carbon atoms;

$R_2$ is selected from the group consisting of hydrogen, alkyl having from one to four carbon atoms, hydroxyalkyl having from two to four carbon atoms;

$R_3$ is selected from the group consisting of hydrogen, alkyl having from one to four carbon atoms, hydroxyalkyl having from two to four carbon atoms, ω-(hydroxyalkylamino)alkyl and ω-[bis(hydroxyalkyl)amino]alkyl having from two to four carbon atoms in each alkyl moiety;

$R_2$ and $R_3$ when taken together with the nitrogen atom to which they are attached are selected from the group consisting of piperazino, N-alkylpiperazino having from one to four carbon atoms in the alkyl moiety, N-ω-(hydroxyalkyl)piperazino having from two to four carbon atoms in the alkyl moiety, N-(carbalkoxy)piperazino having from one to four carbon atoms in the alkoxy moiety, pyrrolidino, piperidino and 2,6-dimethylpiperidino; with the proviso that when $R_2$ is alkyl, $R_3$ is alkyl or hydroxyalkyl; and when $R_2$ is hydroxyalkyl $R_3$ is hydroxyalkyl;

$R_4$ is selected from the group consisting of hydrogen, alkyl having from one to four carbon atoms, hydroxymethyl, 1-hydroxyethyl, mercaptomethyl, 2-methylmercaptoethyl, 4-(or 5)-imidazolylmethyl, benzyl, 4-hydroxybenzyl, 3,4-dihydroxybenzyl, 3,5-dibromo-4-hydroxybenzyl, carboxy, carbalkoxy having from one to four carbon atoms in the alkoxy moiety, ω-carboxyalkyl having from one to two carbon atoms in the alkyl moiety, ω-(carbalkoxy)alkyl having from one to four carbon atoms in the alkoxy group and from one to two carbon atoms in the alkyl group, ω-aminoalkyl having from two to four carbon atoms in the alkyl moiety, and ω-carboxamidoalkyl having from one to two carbon atoms in the alkyl moiety; 3-guanidinopropyl, 3-ureidopropyl, and 3-indolylmethyl;

$R_5$ is selected from the group consisting of hydroxy, alkoxy having from one to four carbon atoms, amino and dialkylamino having from one to four carbon atoms in each alkyl moiety.

Also included in this invention are the pharmaceutically-acceptable alkali metal salts (sodium and potassium) of these compounds which contain at least one carboxy group; i.e., those wherein R is ω-carboxyalkanoyl or $R_5$ is hydroxy or $R_4$ is carboxy or ω-carboxyalkyl; and the pharmaceutically-acceptable acid addition salts of those compounds in which the amide moiety has a basic group such as those wherein $R_3$ is ω-(hydroxyalkylamino)alkyl-, ω-[bis(hydroxyalkyl)amino]- or wherein $R_4$ is ω-aminoalkyl- or 3-guanidinopropyl- and those wherein $NR_2R_3$ is piperazino, N-(ω-hydroxyalkyl)piperazino or N-alkylpiperazino. Representative of the acid addition salts are the hydrochloride, hydrobromide, sulfate, phosphate, nitrate, acetate, propionate, butyrate, citrate, gluconate, tartrate, benzoate, succinate, malate, maleate and fumarate.

In addition to the alkali metal salts of those compounds of this invention containing a carboxy group, salts with metals such as the alkaline earth metals, especially calcium and magnesium, and with aluminum, zinc and bismuth and metals of Group VIII of the Periodic Chart of the Elements are also included.

DETAILED DESCRIPTION OF THE INVENTION

The novel products of this invention, that is, all compounds of formulae I and II except that wherein $R_1$ is acetyl and each of $R_2$ and $R_3$ is hydrogen, are prepared by acylation of the appropriate amine $HNR_2R_3$ or amino acid $R_4CH(NH_2)COR_5$ reactant with an acid halide (chloride or bromide) of 11-deoxoglycyrrhetinic acid in which the 3-hydroxy group is suitably protected as, for example, by acylation with a monocarboxylic acid, anhydride or acid halide, or with the acid chloride of a dicarboxylic acid half-ester. Protection of the 3-hydroxy group is necessary to permit formation of the acid halide of 11-deoxoglycyrrhetinic acid. The acid halides of the 3-acyl-11-deoxoglycyrrhetinic acids are prepared by treating the 3-acyl-11-deoxoglycyrrhetinic acids with excess thionyl chloride or bromide at from about room temperature to the boiling point of the thionyl halide and, subsequently, removing the excess thionyl halide. The favored acid halides are the acid chlorides since they provide satisfactory yields of desired product. The favored protecting group at the 3-hydroxy group is acetyl since it is easily removed by mild hydrolysis to regenerate the free hydroxy group.

Compounds of the above formulae wherein $R_1$ is ω-carboxyalkanoyl group, e.g., an alkyl ester, and preferably a methyl or are hydrolyzed, by means of lithium iodide in N,N-dimethylformamide at the reflux temperature. This treatment, of course, also hydrolyzes any ester group present in the amide moiety. Alternatively, an ω-carbobenzyloxyalkanoyl derivative can be used in place of an ω-carbalkoxyalkanoyl derivative. The benzyl group is easily removed by catalytic hydrogenation, e.g., with palladium on charcoal. This procedure has the advantage of permitting retention of alkyl ester groups in the amide moiety.

The 3-acyl-11-deoxoglycyrrhetinic acid amides thus produced, in addition to being anti-inflammatory and antiulcer agents, serve as intermediates, particularly for the production of half esters with dicarboxylic acids. The 3-hydroxy group produced on hydrolysis is reacylated with a different acid (e.g., acid anhydride or halide), especially with a dicarboxylic acid, to produce a half-ester of the dicarboxylic acid, e.g., a hemisuccinate.

When the amide moiety (formulae I and II) contains an amino, hydroxy or mercapto group, such group must first be protected before acylation of the 3-hydroxy group. A suitable and convenient protecting group is the benzyl group since it is easily removed by hydrogenolysis. This group can be present in the $HNR_2R_3$ or $R_4CH(NH_2)COR_5$ reactant or be introduced into the 3-acyl-11-deoxoglycyrrhetinic acid amide.

The compounds described herein are effective antiulcer agents via the intraperitoneal and oral routes of administration against gastric and duodenal ulcers. These products not only accelerate healing of such ulcers but also prevent formation of ulcers and decrease gastric acid output in animals, including humans. They can, therefore, be said to be useful for the control of gastric and duodenal ulcers. The incidence of side effects, e.g., aldosterone-like fluid retention and electrolyte disturbances, attendant with the use of many of the compounds of this invention is relatively low and is nonexistent with some of them. Particularly valuable in this respect are 1-(3β-acetoxy-11-deoxo-18β-olean-12-en-30-oyl) - 4 - (2 - hydroxyethyl)piperazine; N-(2-hydroxyethyl)-3β-hydroxy-11-deoxo-18β-olean-12-en-30-carboxamide; and N - [3-[bis-(2 - hydroxyethyl)amino]propyl]-3β-acetoxy-11-deoxo-18β-olean-12-en-30-carboxamide.

The valuable products of this invention can be administered alone or in combination with a pharmaceutical carrier selected on the basis of the chosen route of administration and standard pharmaceutical practices. For example, they can be administered orally in the form of tablets containing such excipients as polyvinylpyrrolidone, a Carbowax (non-volatile, solid polyethylene glycols available from Carbide and Carbon Chemicals Corporation), especially Carbowax 6000, starch, milk sugar, etc. or in capsules alone or in admixture with the same or equivalent excipients. They may also be administered orally in the form of elixirs or oral suspensions which may contain flavoring or coloring agents or be injected parenterally; that is, for example, intramuscularly or subcutaneously. For parenteral administration, they are best used in the form of a sterile solution which may be either aqueous such as water, isotonic saline, isotonic dextrose, Ringer's solution, or non-aqueous such as fatty oils of vegetable origin (cotton seed, peanut oil, corn, sesame) and other non-aqueous vehicles which will not interfere with the therapeutic efficiency of the preparation and are non-toxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents as well as local anesthetics and inorganic salts to afford desirable pharmacological properties.

For both oral and intraperitoneal administration, a dosage range of from about 150 mg. to about 300 mg. per day is effective. The dosage level can, with careful supervision, range up to as high as about two grams per day. Propylene glycol is a suitable and convenient carrier or diluent for intraperitoneal use. Carbowax 6000 is a favored excipient for oral use. Compositions containing from about 50% to about 90% by weight of polyvinylpyrrolidone or Carbowax 6000 are especially effective for oral administration. Higher or lower amounts of excipient can, of course, be used but appear to offer no advantages over these proportions. For intraperitoneal use, the polyvinylpyrrolidone formulations are suspended in carriers such as water or in saline solution containing 1% carboxymethylcellulose and 0.1% Tween 80 (polyoxyethylene ethers of partial esters of fatty acids and hexitol anhydrides derived from sorbitol, available from Atlas Chemical Industries, Inc.). The water soluble products of this invention are conveniently administered in water solution.

The effectiveness of the products of this invention as antiulcer agents is determined by the stressed rat assay as follows.

Cold-restraint stressed rat: Non-fasted female rats (Charles River C–D strain) weighing 70–140 gms. are administered the drug or carrier (control animals) intraperitoneally (in saline solution containing 1% carboxymethylcellulose and 0.1% Tween 80) or orally (in water) three hours before being lightly anesthetized with ether and taped in the supine position to individual sheets of Plexiglass. After recovery from the anesthesia, the restrained animals are positioned horizontally in a refrigerator maintained at 10–12° C. and three hours later sacrificed by cervical dislocation. The abdomen of each rat is opened, the pylorus clamped, the stomach inflated with saline via an oral tube, the esophagus clamped and the stomach excised. The stomachs are placed in a 0.4% formaldehyde solution for approximately 30 seconds to harden the outer layers and facilitate examination. Each stomach is then cut open along the greater curvature and the glandular portion (hind stomach) examined for damage. The number of gastric erosions, their severity and the color of the stomachs is recorded. The Mann-Whitney-Wilcoxon rank sum test is used to compare the median number of gastric erosions in the control group with the median number of gastric erosions in each drug-treated groups to determine if they are statistically different. (Dixon et al., "Introduction to Statistical Analysis," 3rd ed., McGraw-Hill Book Company, New York, pp. 344–347, 1969.)

Results thus obtained with carbenoxolone (Drug A) and 1-(3β-acetoxy-18β-olean-12-en-30-oyl) - 4 - (2 - hydroxyethyl)piperazine hydrochloride (Drug B) are presented below.

TABLE I.—ANTIULCER ACTIVITY IN STRESSED RAT ASSAY

| Drug [1] | Carrier [2] | Route [3] | 20 | 30 | 40 | 60 | 80 | 160 | 320 | 640 |
|---|---|---|---|---|---|---|---|---|---|---|
| A | Distilled water | P.o. | | | No. | | No. | No. | No. | No. |
| A | Saline | I.p. | No. | Yes. | Yes. | Yes. | Yes. | | | |
| B | Distilled water | P.o. | | | No. | | | No. | | |
| B | Saline | I.p. | No. | Yes. | Yes. | Yes. | Yes. | | | |
| 50% B-50% PVP | Distilled water | P.o. | | | No. | No. | Yes. | Yes. | | |
| 50% B-50% PVP | do | I.p. | | | No. | | | | | |

[1] PVP = polyvinylpyrrolidone.
[2] Saline = saline solution containing 1% carboxymethylcellulose and 0.1% Tween 80.
[3] P.o. = oral; i.p. = intraperitoneal.

A significant reduction in gastric glandular mucosal lesions at 80 and 160 mg./kg. is obtained with Drug B-PVP formulations via the oral route. Unformulated Drug B is comparable to carbenoxolone via the intraperitoneal route.

The effect of the products of this invention on renal excretion of water and electrolytes in rats is determined in the following manner:

Rat diuretic assay: The water load (25 ml./kg.) or water load-containing drug is administered orally to each of three groups of two rats. Urine is collected for 5 hours and the samples from each group are analyzed by standard flame photometric techniques for sodium and potassium content. Urinary volume (ml./kg./5 hr.), sodium excreted (meq./kg./5 hr.), potassium excreted (meq./ kg./5 hr.), and the sodium-potassium ratio is calculated for each group. The sodium/potassium ratio is modified by raising the denominator to the 1.3 power to yield a measure which is independent of the sodium/volume and potassium/volume ratios. Dose-response regression lines are calculated by combining data from all trials using water controls as zero dose.

Effect of carbenoxolone and PVP formulated Drug B on the renal excretion of water and electrolytes and the Na/K ratio in the rat

|  | Carbenoxolone | 50% Drug B–50% PVP formulation |
|---|---|---|
| Volume (ml./kg./5 hrs.) | ↓↓ | [↓] |
| Na (meq./kg./5 hrs.) | ↓↓ | [↑] |
| K (meq./kg./5 hrs.) | [↑] | [↑] |
| Na/K | ↓↓↓ | (1) |
| [Na] (meq./l.) | [↓] | ↑↑ |
| [K] (meq./l.) | ↑↑↑ | ↑ |

[1] No effect.

The number of arrows indicate the magnitude of the effect; brackets [ ] indicate a non-significant effect.

In water loaded rats, with increasing dose, carbenoxolone causes a moderate decrease in urinary volume and sodium, a marked decrease in the sodium/potassium ratio and a marked increase in potassium concentration, a slight but non-significant increase in urinary potassium and a decrease in urinary sodium concentration. In contrast, formulated Drug B caused a moderate increase in uninary sodium concentration, a slight increase in potassium concentration, and a slight but non-significant increase in both urinary sodium and potassium and a decrease in urinary volume. It had no effect on the sodium/potassium ratio. The rate of increase in urinary potassium concentration with increasing doses of carbenoxolone is significantly greater than with formulated Drug B. The rate of decrease in urinary volume with dose is significantly greater with carbenoxolone than with formulated Drug B Their effect on gastric acid output in pylorus-ligated (i.e. Shay) rats is determined by the following procedure.

Shay rat: Forty-eight hours before surgery female rats (Charles River C–D strain; 100–140 gms.) are individually caged and taken off normal food. Each animal is given two sugar cubes and water *ad libitum* to effect emptying of the stomach. Drug or carrier is administered intraperitoneally and three hours later, under ether anesthesia, the abdomen is shaved and opened along the linea alba. After exposing and ligating the pylorus, the incision is closed and the animal is returned to its cage and allowed to regain consciousness. Three hours later the animal is sacrificed by cervical dislocation, the abdomen reopened, the distal esophagus clamped, and the stomach excised. The stomach is cut open and the contents washed into a beaker with one ml. of deionized water. The volume of gastric juice is recorded following centrifugation. Excessively dirty (greater than 0.5 ml. of solids) or bloody samples are discarded. The acidity of one ml. of gastric juice is determined by titration with a standardized NaOH (0.1 N) solution using phenolphthalein as an indicator and total acid output ($\mu$eq. H$^+$/100 gms. body weight/3 hours) is calculated. A non-paired t test is used to compare the means of the control and tested groups. (Dixon et al., Technometrics, X, 83–98, 1968). Carbenoxolone and Drug B at 40 mg./kg. body weight consistently reduced gastric acid output in the three hour Shay rat. At 80 mg./kg., carbenoxolone, in contrast to Drug B, significantly decreased acid output in the Shay rat. N-[2-(2-hydroxyethylamino) - 3$\beta$-acetoxy-18$\beta$-olean-12-en-30-carboxamide and N-(3$\beta$-acetoxy-18$\beta$-olean - 12 - en-30-oyl)-L-histidine, methyl ester exhibit no effect upon acid output in the Shay rat.

EXAMPLE I

N-(2-hydroxyethyl)-3$\beta$-hydroxy-18$\beta$-olean-12-en-30-carboxamide (A) 3$\beta$-hydroxy-18$\beta$-olean-12-en-30-oic acid: Eighty grams (0.169 M) of 18$\beta$-glycyrrhetinic acid in 1500 ml. of glacial acetic acid is hydrogenated at 50° C. using 20 g. of platinum oxide. The reaction is allowed to proceed for 3 hours at a pressure of 350 p.s.i. Additional solvent is added to the reaction in an attempt to dissolve some of the product which precipitates. The catalyst is filtered and thoroughly washed with chloroform. Concentration of the combined filtrates followed by recrystallization of the solid residue from acetic acid gives 35.4 g., 46.6% of the title product; M.P. 319°–321° C. Ruzicka et al., Helv. Chim. Acta *20*, 1271 (1937) report M.P. 330° C.

(B) 3$\beta$-acetoxy-18$\beta$-olean-12-en-30-oic acid: To a solution of 53.8 g. (0.120 M) of 3$\beta$-hydroxy-18$\beta$-olean-12-en-30-oic acid in 615 ml. of pyridine is added 615 ml. of acetic anhydride. The reaction is refluxed for one hour, cooled and stirred at room temperature for twenty-three hours. It is acidified with 10% hydrochloric acid and the resulting precipitate filtered and dissolved in chloroform. The chloroform solution is washed with water, dried over sodium sulfate and treated with activated charcoal. Concentration of the solution gives a solid which is recrystallized from methanol-chloroform to give 50.8 g., 85% of the acetoxy derivative; M.P. 300°–302° C. Corey et al., J. Am. Chem. Soc., *81*, 1745 (1959) report M.P. 305°–307° C.

(C) 3$\beta$-acetoxy-18$\beta$-olean - 12 - en-30-oyl chloride: A solution of 42.0 g. (0.0843 M) of 3$\beta$-acetoxy-18$\beta$-olean-12-en-30-oic acid in 400 ml. of thionyl chloride is stirred at 50° C. for one hour. The excess thionyl chloride is removed under reduced pressure and the residue recrystallized from methylene chloride-hexane to give 37.9 g., 87% of the desired acid chloride; M.P. 245.5°–247.5° C. Ruzicka et al., Helv. Chim. Acta *22*, 195 (1939) report M.P. 248°–251° C.

(D) N-(2 - hydroxyethyl)-3$\beta$-acetoxy-18$\beta$-olean-12-en-30-carboxamide: A solution of 10.45 g. (0.0202 M) of 3$\beta$-acetoxy-18$\beta$-olean-12-en-30-oyl chloride in 75 ml. of methylene chloride is added dropwise with stirring to a solution of 126 ml. (2.02 M) of 2-aminoethanol in 55 ml. of methylene chloride.

The reaction is stirred at room temperature for 17 hours and then washed successively with 10% hydrochloric acid, sodium bicarbonate solution and water. The organic layer is dried over sodium sulfate and concentrated to dryness to give 10.8 g., 98.5% of the intermediate acetate; M.P. 239°–240° C.

(E) Hydrolysis of intermediate acetate: A solution of 10.28 g. (0.0188 M) of acetate in 100 ml. of methanol and 535 ml. of 10% KOH/MeOH is stirred at room temperature for eighteen hours and then concentrated to dryness, acidified with 10% hydrochloric acid and extracted with methylene chloride. The combined organic extracts are dried over sodium sulfate and concentrated to dryness. Recrystallization of the residue yields 7.54 g., 80.3% of the title amide product; M.P. 245°–247° C.

EXAMPLE II 1-(3$\beta$-acetoxy-18$\beta$-olean-12-en-30-oyl)-4-(2-hydroxyethyl)piperazine To a solution of 5.20 g. (0.0386 M) of piperazine ethanol in 100 ml. of methylene chloride is added dropwise with stirring 10.0 g. (0.0193 M) of acid chloride (Example I–C). A precipitate forms approximately five minutes after the acid chloride is added. The reaction mixture is stirred at room temperature for 15 hours and then made basic with 50% sodium hydroxide. The basic mixture is extracted with methylene chloride and the combined organic extracts washed with water, dried over sodium sulfate and treated with activated charcoal. Removal of the solvent and recrystallization of the residue from acetone affords 9.15 g., 77.6% of the title product; M.P. 234°–235° C.

The hydrochloride salt is prepared by bubbling hydrogen chloride gas into a solution of the title product in chloroform at 10°–15° C. The salt is precipitated by addition of ether, and then filtered and dried. It is recrystallized from chloroform-ether; M.P. 320°–323° C.

EXAMPLE III

N-[3-[bis-(2-hydroxyethyl)amino]propyl]-3β-acetoxy-18β-olean-12-en-30-carboxamide A solution of 7.7 g. (0.048 M) of N-(3-aminopropyl) diethanolamine in 50 ml. of methylene chloride is treated dropwise with 10.0 g. (0.019 M) of 3β-acetoxy-18β-olean-12-en-30-oyl chloride in 50 ml. of methylene chloride. The reaction is stirred at room temperature for 3 hours and then made basic with 50% sodium hydroxide. The mixture is extracted with methylene chloride and the combined organic extracts washed with water, dried over sodium sulfate, and treated with activated charcoal. The solvent is removed and the residue triturated with ether to give a solid which is recrystallized from acetone yielding 7.8 g., 65% of product; M.P. 192°–194° C.

The hydrochloride salt is prepared according to the procedure of Example II but using methylene chloride in place of chloroform as solvent; M.P. 282°–283° C.

The title compound is hydrolyzed to its 3β-hydroxy derivative by the procedure of Example V-B.

EXAMPLE IV

N-[3-(2-hydroxyethylamino)propyl]3β-acetoxy-18β-olean-12-en-30-carboxamide

To a solution of 3.77 g. (0.032 M) of 1,3-diamine-N-(β-hydroxyethyl)propane in 50 ml. of methylene chloride is added dropwise with stirring 7.0 g. (0.013 M) of the acid chloride of Example I–C in 75 ml. of methylene chloride. The reaction mixture is stirred at room temperature for 20 hours and made basic with 50% sodium hydroxide. The methylene chloride layer is removed, washed with water and dried over sodium sulfate. Removal of the solvent and trituration of the residue with ether gives the product as a solid. Recrystallization of the solid from acetone affords 6.15 g., 79.1% of product; M.P. 188°–189° C.

EXAMPLE V 1-(3β-hydroxy-18β-olean-12-en-30-oyl)-4-methylpiperazine hydrochloride (A) 1-(3β-acetoxy)-18β - olean - 12 - en - 30-oyl)-4-methylpiperazine: To a solution of 10.5 g. (0.0202 M) of 3β-acetoxy-11-deoxo-18β-olean-12-en - 30-oyl chloride in 100 ml. of methylene chloride is added 4.1 g. (0.040 M) of 1-methylpiperazine. The reaction mixture is stirred at room temperature for 19 hours and then washed successively with dilute hydrochloric acid, aqueous sodium bicarbonate and water. The organic layer is separated, dried over sodium sulfate and concentrated to give 10.9 g., 93.7% of the acetate; M.P. 198°–200° C.

(B) Hydrolysis of the acetate: The acetate 8.0 g. (0.014 M) is stirred in 528 ml. of 10% KOH/MeOH at room temperature for 40 hours. The reaction is then concentrated to dryness, acidified with 10% hydrochloric acid and extracted with methylene chloride. The combined organic extracts are dried over sodium sulfate, concentrated to dryness and the resulting solid recrystallized from methanol yielding 5.2 g., 65.8% of the title piperazide; M.P. 324°–325° C.

EXAMPLE VI

N-[2-(2-hydroxyethylamino)ethyl]-3β-acetoxy-18β-olean-12-en-30-carboxamide

To a solution of hydroxyethylethylenediamine 2.6 g. (0.025 M) in 50 ml. of methylene chloride is added 5.0 g. (0.01 M) of 3β-acetoxy-18β-olean-12-en-30-oyl chloride (Example I–C) in 50 ml. of methylene chloride over a period of 15 minutes. The reaction is stirred at room temperature for 4 hours and then made basic with 25% sodium hydroxide solution. The organic layer is separated, washed with water and dried over sodium sulfate. Concentration of the solution gives a solid which is recrystallized from acetone yielding 2.49 g., 42.5% of product; M.P. 180°–182° C.

The hydrochloride salt, formed by bubbling hydrogen chloride into a methylene chloride solution of the base, precipitates from solution. It is filtered, dried and recrystallized from ethanol; M.P. 318°–320° C.

EXAMPLE VII (A) The 3β-acyl-glycyrrhetinic acid amides listed below are prepared from the appropriate amine $HNR_2R_3'$ and the appropriate 3β-acyl-11-deoxoglycyrrhetinic acid chlorides of Example I–C and Preparation A ($R_3'$=hydrogen and $R_3$) by the procedure of Example VI.

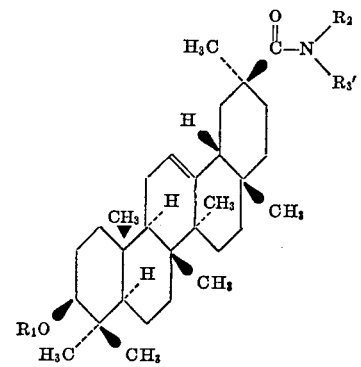

| $R_1$ | $R_2$ | $R_3'$ |
|---|---|---|
| $CH_3CO$ | H | $CH_3$ |
| $CH_3CO$ | H | $C_2H_5$ |
| $CH_3CO$ | H | $i-C_3H_7$ |
| $CH_3CO$ | H | $n-C_4H_9$ |
| $CH_3CO$ | $CH_3$ | $CH_3$ |
| $CH_3CO$ | $n-C_3H_7$ | $n-C_3H_7$ |
| $CH_3CO$ | H | $(CH_2)_3OH$ |
| $CH_3CO$ | H | $(CH_2)_2OH$ |
| $CH_3CO$ | $CH_3$ | $CH_2CH_2OH$ |
| $CH_3CO$ | $C_4H_9$ | $CH_2CH_2OH$ |
| $CH_3CO$ | $CH_2CH_2OH$ | $CH_2CH_2OH$ |
| $CH_3CO$ | $CH_2CH(OH)CH_3$ | $CH_2CH(OH)CH_3$ |
| $CH_3CO$ | $CH_3$ | $CH_2CH(OH)CH_3$ |
| $CH_3CH_2CO$ | H | H |
| $CH_3CH_2CO$ | H | $n-C_3H_7$ |
| $CH_3CH_2CO$ | $CH_3$ | $CH_3$ |
| $CH_3CH_2CO$ | $CH_3$ | $n-C_3H_7$ |
| $CH_3CH_2CO$ | H | $CH_2CH_2OH$ |
| $CH_3CH_2CO$ | H | $CH(C_2H_5)CH_2OH$ |
| $CH_3CH_2CO$ | $CH_3$ | $CH_2CH_2OH$ |
| $CH_3CH_2CO$ | $C_2H_5$ | $CH_2CH_2OH$ |
| $CH_3CH_2CO$ | $n-C_4H_9$ | $CH_2CH_2OH$ |
| $CH_3CH_2CO$ | $(CH_2)_3OH$ | $(CH_2)_3OH$ |
| $CH_3(CH_2)_2CO$ | H | H |
| $CH_3(CH_2)_2CO$ | H | $C_2H_5$ |
| $CH_3(CH_2)_2CO$ | $CH_3$ | $CH_3$ |
| $CH_3(CH_2)_2CO$ | $n-C_4H_9$ | $n-C_4H_9$ |
| $CH_3(CH_2)_2CO$ | H | $CH_2CH_2OH$ |
| $CH_3(CH_2)_2CO$ | H | $CH_2CH(OH)CH_3$ |
| $CH_3(CH_2)_2CO$ | $CH_3$ | $CH_2CH_2OH$ |
| $CH_3(CH_2)_2CO$ | $C_2H_5$ | $(CH_2)_4OH$ |
| $CH_3(CH_2)_2CO$ | $CH_2CH_2OH$ | $CH_2CH_2OH$ |
| $CH_3(CH_2)_3CO$ | H | H |
| $CH_3(CH_2)_3CO$ | $C_2H_5$ | $C_2H_5$ |
| $CH_3(CH_2)_3CO$ | H | $(CH_2)_3OH$ |
| $CH_3(CH_2)_3CO$ | $(CH_2)_3OH$ | $(CH_2)_3OH$ |
| $CH_3(CH_2)_3CO$ | $C_2H_5$ | $(CH_2)_3OH$ |
| $CH_3(CH_2)_4CO$ | H | H |
| $CH_3(CH_2)_4CO$ | H | $i-C_4H_9$ |
| $CH_3(CH_2)_4CO$ | H | $C_2H_5$ |
| $CH_3(CH_2)_4CO$ | $CH_3$ | $i-C_3H_7$ |
| $CH_3(CH_2)_4CO$ | $CH_3$ | $i-C_3H_7$ |

TABLE—Continued

| R₁ | R₂ | R₃' |
|---|---|---|
| CH₃(CH₂)₄CO | H | CH₂CH₂OH |
| CH₃(CH₂)₄CO | CH₂CH₂OH | CH₂CH₂OH |
| CH₃(CH₂)₄CO | H | (CH₂)₄OH |
| CH₃(CH₂)₄CO | (CH₂)₄OH | (CH₂)₄OH |
| CH₃(CH₂)₄CO | CH₃ | CH₂CH₂OH |
| CH₃CO | H | (CH₂)₂NH(CH₂)₃OH |
| CH₃CO | H | (CH₂)₂NH(CH₂)₄OH |
| CH₃CO | H | (CH₂)₂N((CH₂)₄OH)₂ |
| CH₃CO | H | (CH₂)₄N(CH₂CH₂OH)₂ |
| CH₃CO | H | (CH₂)₄NH(CH₃)₄OH |
| CH₃CH₂CO | H | (CH₂)₃NH(CH₂CH₂OH) |
| CH₃CH₂CO | H | (CH₂)₄N(CH₂CH₂OH)₂ |
| CH₃(CH₂)₂CO | H | (CH₂)₂N(CH₂CH₂CH₂OH)₂ |
| CH₃(CH₂)₄CO | H | (CH₂)₂NH(CH₂)₄OH |
| CH₃CO | | CH₂CH₂NHCH₂CH₃ |
| CH₃CO | | CH₂CH₂N(C₂H₅)CH₂CH₃ |
| CH₃CO | | CH₂CH₂N(n-C₄H₉)CH₂CH₃ |
| CH₃CO | | CH₂CH₂N[(CH₂)₄OH]CH₂CH₃ |
| CH₃CO | | CH₂CH₂N(COOCH₃)CH₂CH₃ |
| CH₃CO | | CH₂CH₂N(COO-n-C₃H₇)CH₂CH₃ |
| CH₃CO | | CH₂CH₂CH₂CH₃ |
| CH₃CO | | CH₂CH₂CH₂CH₂CH₃ |
| CH₃CO | | CH(CH₃)CH₂CH₂CH₂CH(CH₃) |
| CH₃CH₂CO | | CH₂CH₂NHCH₂CH₃ |
| CH₃CH₂CO | | CH₂CH₂N(CH₃)CH₂CH₃ |
| CH₃CH₂CO | | CH₂CH₂N(CH₂CH₂OH)CH₂CH₃ |
| CH₃CH₂CO | | CH₂CH₂N(COOCH₃)CH₂CH₃ |
| CH₃CH₂CO | | CH₂CH₂CH₂CH₃ |
| CH₃CH₂CO | | CH₂CH₂CH₂CH₂CH₃ |
| CH₃CH₂CO | | CH(CH₃)CH₂CH₂CH₂CH(CH₃) |
| CH₃(CH₂)₂CO | | CH₂CH₂N(CH₃)CH₂CH₃ |
| CH₃(CH₂)₂CO | | CH₂CH₂N(CH₂CH₂OH)CH₂CH₃ |
| CH₃(CH₂)₂CO | | CH₂CH₂CH₂CH₃ |
| CH₃(CH₂)₂CO | | CH₂CH₂CH₂CH₂CH₃ |
| CH₃(CH₂)₃CO | | CH₂CH₂NHCH₂CH₃ |
| CH₃(CH₂)₃CO | | CH₂CH₂N(i-C₃H₇)CH₂CH₃ |
| CH₃(CH₂)₃CO | | CH₂CH₂N(CH₂CH₂CH₂OH)CH₂CH₃ |
| CH₃(CH₂)₃CO | | CH₂CH₂N(COOC₂H₅)CH₂CH₃ |
| CH₃(CH₂)₃CO | | CH₂CH₂N(n-C₃H₇)CH₂CH₃ |
| CH₃(CH₂)₄CO | | CH₂CH₂N(COO-n-C₄H₉)CH₂CH₃ |
| CH₃(CH₂)₄CO | | CH₂CH₂CH₂CH₃ |
| CH₃CO | H | CH(C₂H₅)CH₂OH |
| CH₃CO | H | CH(CH₃)CH(OH)CH₃ |
| CH₃CO | H | CH₂CH₂OC₇H₇ |
| CH₃CO | H | (CH₂)₃OC₇H₇ |
| CH₃CO | H | (CH₂)₄OC₇H₇ |
| CH₃CO | CH₂CH₂OC₇H₇ | CH₂CH₂OC₇H₇ |
| CH₃CO | CH₂CH(OC₇H₇)CH₃ | CH₂CH(OC₇H₇)CH₃ |
| CH₃CO | CH₃ | CH₂CH₂OC₇H₇ |
| CH₃CO | C₄H₉ | CH₂CH₂OC₇H₇ |
| CH₃CH₂CO | H | CH₂CH₂OC₇H₇ |
| CH₃CH₂CO | (CH₂)₂OC₇H₇ | (CH₂)₂OC₇H₇ |
| CH₃(CH₂)₂CO | H | CH₂CH₂OC₇H₇ |
| CH₃(CH₂)₂CO | C₂H₅ | (CH₂)₄OC₇H₇ |
| CH₃(CH₂)₃CO | H | (CH₂)₃OC₇H₇ |
| CH₃(CH₂)₄CO | (CH₂)₄OC₇H₇ | (CH₂)₄OC₇H₇ |

(B) Hydrolysis of the 3-acyloxy groups of the above compounds according to the procedure of Example V-B provides the corresponding 3-hydroxy derivatives.

EXAMPLE VIII

Hemisuccinate of N-(2-hydroxyethyl)-3β-hydroxy-18β-olean-12-en-30-carboxamide (A) 3β - (β-carbomethoxypropionyloxy) - 18β-olean-12-en-30-oic acid: A solution of 11-deoxoglycyrrhetinic acid (5.0 g.) in pyridine (20 ml.) is treated with a solution of β-carbomethoxypropionyl chloride (3 ml.) in pyridine (50 ml.). The reaction mixture is allowed to stand for four days and then poured into water (100 ml.). The product is extracted with ether (3 × 250 ml.), the combined ethereal extracts dried (MgSO₄) and evaporated under reduced pressure. The residue is recrystallized from methanol-water.

Similarly, the corresponding 3β - (γ - carbomethoxybutyryloxy)-derivative is prepared substituting γ-carbomethoxybutyrylchloride for β - carbomethoxypropionyl chloride.

(B) A solution of 3β-(β-carbomethoxypropionyloxy)-18β-olean-12-en-30-oyl chloride (11.54 g., 0.02 M, prepared from the precursor acid by the procedure of Example I-C) in methylene chloride (75 ml.) is added dropwise with stirring to a solution of 2-aminoethanol (2.0 M) in methylene chloride (50 ml.) and the mixture stirred at room temperature for 17 hours. It is then washed successively with 10% hydrochloric acid, sodium bicarbonate solution and water and then dried (Na₂SO₄). The product is recovered by removal of the solvent under reduced pressure.

(C) Hydrolysis of the ester is accomplished by treating a solution of the ester in N,N-dimethylformamide (15 ml./1.0 mM. of ester) with lithium iodide (1.0 g./1.0 mM. of ester) under reflux for 12 hours. The reaction mixture is cooled, poured into water and the product recovered by filtration if solid or by extraction with methylene chloride.

In this manner, the hemisuccinate and hemiglutarate esters of the amides of Examples I–VII are prepared by substituting the appropriate 3β-carbomethoxyalkanoyloxy-11 - deoxyglycyrrhetinic acid chloride for the 3β - alkanoyloxy-11-deoxo-glycyrrhetinic acid chloride of the examples.

EXAMPLE IX

N-(3β-acetoxy-18β-olean-12-en-30-oyl)L-histidine methyl ester

A solution of 15.0 g. (0.0291 M) of 3β-acetoxy-18β-olean-12-en-30-oyl chloride in 75 ml. of methylene chloride is added dropwise to a hazy solution of 7.04 g. (0.0291 M) of L-histidine methyl ester dihydrochloride and 11.3 g. (0.0872 M) of N,N-diisopropylethylamine in 175 ml. of methylene chloride. The reaction mixture is stirred at room temperature for five days and then washed with water, treated with activated charcoal and dried over magnesium sulfate. Concentration of the solution leaves an oily solid which is crystallized with hot methanol and, subsequently, recrystallized from chloroform-methanol to give 5.6 g. of unidentified by-product; M.P. 262°–263° C., and impure product. The impure product is recrystallized from chloroform-methanol yielding 11.57 g., 61.5% of the title product; M.P. 207°–209° C.

EXAMPLE X

Repetition of the procedure of Example IX but using the appropriate amino acid in place of L-histidine methyl ester dihydrochloride and the appropriate 3β-acyl-11-deoxoglycyrrhetinic acid chlorides affords the following compounds. Sufficient N,N-diisopropylethylamine is used in a given reaction to neutralize the acid (HCl) by-product plus any acid introduced with the amino acid reactant.

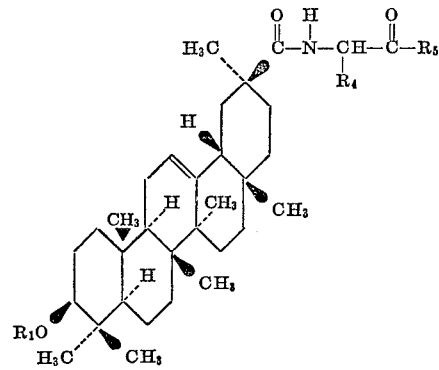

| R₁ | R₄ | R₅ |
|---|---|---|
| CH₃CO | H | OCH₃ |
| CH₃CO | CH₃ | OC₂H₅ |
| CH₃CO | C₂H₅ | OCH₃ |
| CH₃CO | CH₂CH(CH₃)₂ | NH₂ |
| CH₃CO | CH₂OH | O-(n-C₄H₉) |
| CH₃CO | CH(OH)CH₃ | OCH₃ |
| CH₃CO | CH₂-4-(or 5)-Im¹ | OCH₃ |
| CH₃CO | C₆H₅—CH₂ | OC₂H₅ |
| CH₃CO | 4-HOC₆H₄—CH₂ | OCH₃ |
| CH₃CO | COOC₂H₅ | OC₂H₅ |
| CH₃CO | COO-n-C₃H₇ | O-(n-C₄H₇) |
| CH₃CO | CH₂COOH | OCH₃ |
| CH₃CO | CH₂COOH | NH₂ |
| CH₃CO | CH₂CH₂COOH | OC₂H₅ |
| CH₃CO | CH₂CH₂NH₂ | OCH₃ |
| CH₃CO | (CH₂)₄NH₂ | OCH₃ |
| CH₃CO | CH₂CH₂CONH₂ | OCH₃ |
| CH₃CO | CH₂CONH₂ | OC₂H₅ |
| CH₃CO | (CH₂)₃NHC(=NH)NH₂ | NH₂ |
| CH₃CO | (CH₂)₃NHCONH₂ | OCH₃ |
| CH₃CO | CH₂(3-indolyl) | OCH₃ |
| CH₃CO | CH₃ | N(CH₃)₂ |
| CH₃CO | H | N(n-C₃H₇)₂ |
| CH₃CO | CH₂OH | N(C₂H₅)₂ |
| CH₃CO | C₆H₅CH₂ | NH₂ |

TABLE—Continued

| R₁ | R₄ | R₅ |
|---|---|---|
| CH₃CO | (CH₂)₄NH₂ | N(CH₃)₂ |
| CH₃CH₂CO | H | OC₂H₅ |
| CH₃CH₂CO | CH₂SH | OCH₃ |
| CH₃CH₂CO | CH₂CH₂SCH₃ | OCH₃ |
| CH₃CH₂CO | n-C₄H₉ | NH₂ |
| CH₃CH₂CO | CH₂OH | N(C₂H₅)₂ |
| CH₃CH₂CO | CH₂-4-(or 5)-Im¹ | OCH₃ |
| CH₃CH₂CO | C₆H₅CH₂ | O-(n-C₄H₉) |
| CH₃CH₂CO | 3,4-(HO)₂C₆H₃—CH₂ | OCH₃ |
| CH₃CH₂CO | (CH₂)₃NHCONH₂ | N-(i-C₃H₇)₂ |
| CH₃CH₂CO | CH₂CH₂CONH₂ | OCH₃ |
| CH₃CH₂CO | CH₂CH₂NH₂ | OC₂H₅ |
| CH₃(CH₂)₂CO | CH₃ | N-(n-C₃H₇)₂ |
| CH₃(CH₂)₂CO | CH₂CH₂SCH₃ | OCH₃ |
| CH₃(CH₂)₂CO | COO—(n-C₄H₉) | O(n-C₄H₉) |
| CH₃(CH₂)₂CO | COOC₂H₅ | OC₂H₅ |
| CH₃(CH₂)₂CO | C₆H₅CH₂ | NH₂ |
| CH₃(CH₂)₂CO | 3,5-Br-4-HOC₆H₂—CH₂ | OCH₃ |
| CH₃(CH₂)₂CO | n-C₃H₇ | NH₂ |
| CH₃(CH₂)₃CO | CH₂-(3-indolyl) | N-(C₂H₅)₂ |
| CH₃(CH₂)₃CO | CH₂CH₂COOCH₃ | OCH₃ |
| CH₃(CH₂)₃CO | CH₂CH₂COO-n-C₄H₉ | O-n-C₄H₉ |
| CH₃(CH₂)₃CO | CH₂COOC₂H₅ | OC₂H₅ |
| CH₃(CH₂)₃CO | CH₂COOCH₃ | NH₂ |
| CH₃(CH₂)₄CO | CH(CH₃)₂ | OC₂H₅ |
| CH₃(CH₂)₄CO | n-C₃H₇ | OC₂H₅ |
| CH₃(CH₂)₄CO | H | N(n-C₄H₉)₂ |
| CH₃(CH₂)₄CO | CH₂CH₂SCH₃ | N(CH₃)₂ |

¹ Im=imidazolyl.

Hydrolysis of the above products as described in Example V–B affords the corresponding derivatives wherein R₁ is H, and all ester and amide values of R₄ and R₅ are converted to carboxy.

EXAMPLE XI

Hemisuccinate of 1-(3β-hydroxy-18β-olean-12-en-30-oyl)-4-methylpiperazine

The product of Example V (0.01 M) is dissolved in dry pyridine (30 ml.) and a solution of succinic anhydride (0.012 M) in dry pyridine (10 ml.) added, followed by dry triethylamine (5 ml.). The mixture is heated on a boiling water bath for ten hours and then poured into excess dilute hydrochloric acid and ice. The product is filtered off and washed with water. It is then dissolved in chloroform, the solution repeatedly extracted with dilute hydrochloric acid followed by water. The chloroform solution is then dried (Na₂SO₄) and evaporated to give the product.

In like manner, the hemiglutarate is prepared substituting glutaric anhydride for succinic anhydride.

Repetition of this procedure but using the products of Example VII which contain no hydroxyalkyl group in the amide moiety affords the hemisuccinates and hemiglutarates of the compounds.

EXAMPLE XII

N-[3β-(β-carbomethoxypropionyloxy)-18β-olean-12-en-30-oyl]serine, methyl ester

A solution of 3β-(β-carbomethoxypropionyloxy)-18β-olean-12-en-30-oyl chloride (11.54 g., 0.02 M), methyl ester of the hemisuccinate of 11-deoxoglycyrrhetinic acid chloride, in methylene chloride (75 ml.) is added dropwise to a solution of serine methyl ester (2.38 g., 0.02 M) and N,N-diisopropylethylamine (2.58 g., 0.02 M) in methylene chloride (150 ml.). The reaction mixture is stirred for five days at room temperature and then washed with water, decolorized with activated charcoal and dried over magnesium sulfate. Concentration of the solution affords the product.

Repetition of this procedure but using 3β-(γ-carbomethoxybutyryloxy)-18β-olean-12-en-30-oyl chloride as the O-acylating agent provides N-[3β-(γ-carbomethoxybutyryloxy)-18β-olean-12-en-30-oyl)serine, methyl ester.

EXAMPLE XIII

N-[3β-(β-carboxypropionyl)-18β-olean-12-en-30-oyl] serine

The title dimethyl ester product of Example XII (0.659 g., 1 mM.) in N,N-dimethylformamide (75 ml.) is treated with anhydrous lithium iodide (10 g.) and the solution heated at reflux for 12 hours. The reaction mixture is cooled, poured into water and the product recovered by filtration or by extraction with methylene chloride.

Similarly, the remaining diester of Example XII is hydrolyzed to the corresponding product N-[3β-(γ-carboxybutyryloxy)-18β-olean-12-en-30-oyl] serine.

EXAMPLE XIV

N-[3β-(β-carboxypropionyloxy)-18β-olean-12-en-30-oyl] lysine

The procedure of Example XII is repeated but using the ε-carbobenzoxy derivative of lysine methyl ester in place of serine methyl ester. The product thus obtained is taken up in ethanol and treated with hydrogen in the presence of 5% palladium on charcoal to remove the protective carbobenzoxy group. Filtration of the catalyst followed by removal of the solvent gives the methyl ester of the hemisuccinate.

Hydrolysis of the dimethyl ester according to the procedure of Example VIII–C, using, of course, twice the proportion of lithium iodide produces the title product.

EXAMPLE XV

N-[3β-(β-carboxypropionyloxy)-18β-olean-12-en-30-oyl] aspartic acid, methyl ester Following the procedure of Example VIII–A, but using β-carbobenzoxy propionyl chloride produces 3β-(β-carbobenzoxy propionyloxy)-18β-olean-12-en-30-oic acid. The acid chloride is then prepared by the procedure of Example I–C.

Methyl β-amino-β-carbobenzoxy propionate,

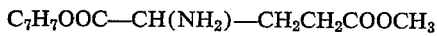

$$C_7H_7OOC-CH(NH_2)-CH_2CH_2COOCH_3$$

is then treated with the above-produced acid chloride by the procedure of Example XII to give the benzyl ester of the title product.

The benzyl group is removed using hydrogen, 5% palladium on carbon in ethanol according to Example XIV to give the title product.

Repetition of this procedure but using methyl γ-amino-γ-carbobenzoxybutyrate in place of methyl β-amino-β-carbobenzoxy butyrate produces the corresponding 3β-(γ-carboxybutyryloxy) derivative.

EXAMPLE XVI

N-[3β-(β-carboxypropionyloxy)-18β-olean-12-en-30-oyl] cysteine

The procedure of Example XII is repeated but using the methyl ester of S-benzylcysteine in place of serine methyl ester. The N-[3β-(β-carbomethoxypropionyloxy)-18β-olean-12-en-30-oyl] S-benzylcysteine, methyl ester thus produced is hydrolyzed by the procedure of Example XIII to the corresponding acid derivative.

Debenzylation is accomplished by treatment with hydrogen in the presence of Pd/C according to Example XIV to give the title product.

Repetition of this procedure using 3β-(γ-carbomethoxy butyryloxy)-18β-olean-12-en-30-oyl chloride as acylating agent provides the hemiglutarate of the title compound.

EXAMPLE XVII

N-[3β-(β-carboxypropionyloxy)-18β-olean-12-en-30-oyl] arginine

This product is prepared from nitro arginine methyl ester hydrochloride and the methyl ester of the hemisuccinate of 11-deoxoglycyrrhetinic acid chloride by the procedure of Example XII. The N-[3β-(β-carbomethoxypropionyloxy)-18β-olean-12-en - 30 - oyl] nitroarginine, methyl ester thus produced is converted to the corresponding arginine methyl ester by reaction with hydrogen and Pd/C as described in Example XIV.

Hydrolysis of the dimethyl ester with lithium iodide according to the procedure of Example XIII affords the title product.

In like manner, the hemiglutarate of the title product is prepared using the methyl ester of the hemiglutarate of 11-deoxoglycyrrhetinic acid chloride.

EXAMPLE XVIII

Following the procedure of Examples VIII and XI–XVI, the compounds listed below are prepared from appropriate reactants.

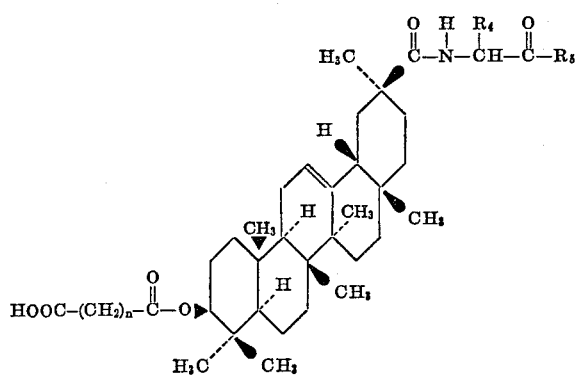

| n | R₄ | R₅ |
|---|---|---|
| 2 | CH(OH)CH₃ | OH |
| 2 | 4-HOC₆H₄—CH₂ | OH |
| 3 | 4-HOC₆H₄—CH₂ | OH |
| 2 | CH₂OH | N(C₂H₅)₂ |
| 3 | CH₂OH | N(C₂H₅)₂ |
| 2 | 3,4-(HO)₂C₆H₃—CH₂ | OH |
| 3 | 3,4-(HO)₂C₆H₃—CH₂ | OH |
| 2 | 3,5-Br₂-4-HOC₆H₂—CH₂ | OH |
| 2 | COOH | OH |
| 3 | COOH | OH |
| 2 | CH₂COOH | OH |
| 3 | CH₂COOH | OH |
| 2 | CH₂COOH | NH₂ |
| 2 | CH₂CH₂COOH | OH |
| 2 | COOC₂H₅ | OH |
| 2 | COO-n-C₄H₉ | OH |
| 2 | CH₂COOC₂H₅ | OH |
| 3 | CH₂COOC₂H₅ | OH |
| 2 | CH₂CH₂COOCH₃ | OH |
| 2 | CH₂COOCH₃ | NH₂ |
| 3 | CH₂COOCH₃ | NH₂ |
| 2 | COOH | N(CH₃)₂ |
| 2 | COOH | N-(n-C₄H₉)₂ |
| 2 | CH₂-4-(or 5)-Im | OH |
| 3 | CH₂-4-(or 5)-Im | OH |
| 2 | CH₂CH₂NH₂ | OH |
| 3 | CH₂CH₂NH₂ | OH |
| 2 | (CH₂)₄NH₂ | OH |
| 2 | (CH₂)₄NH₂ | N(CH₃)₂ |
| 3 | (CH₂)₄NH₂ | N(CH₃)₂ |
| 2 | CH₂CONH₂ | OH |
| 3 | CH₂CONH₂ | OH |
| 2 | CH₂CONH₂ | NH |
| 2 | CH₂CH₂CONH₂ | OH |
| 2 | (CH₂)₃CONH₂ | OH |
| 2 | (CH₂)₃CONH₂ | NH₂ |
| 2 | (CH₂)₃NHCONH₂ | OH |
| 2 | (CH₂)₃NHCONH₂ | N(i-C₃H₇)₂ |
| 3 | (CH₂)₃NHCONH₂ | N(i-C₃H₇)₂ |
| 2 | CH₂(3-indolyl) | OH |
| 3 | CH₂(3-indolyl) | OH |
| 2 | CH₂(3-indolyl) | N(C₂H₅)₂ |
| 2 | H | OH |
| 3 | H | OH |
| 2 | H | NH₂ |
| 2 | H | N(n-C₃H₇)₂ |
| 3 | H | N(n-C₃H₇)₂ |
| 2 | CH₃ | OH |
| 2 | CH₃ | N(CH₃)₂ |
| 3 | CH₃ | N(CH₃)₂ |
| 2 | CH₃ | N(n-C₃H₇)₂ |
| 2 | C₂H₅ | OH |
| 2 | n-C₃H₇ | NH₂ |
| 3 | n-C₃H₇ | NH₂ |
| 2 | CH₂CH(CH₃)₂ | NH₂ |
| 2 | n-C₄H₉ | NH₂ |
| 3 | n-C₄H₉ | NH₂ |
| 2 | C₆H₅—CH₂ | OH |
| 3 | C₆H₅—CH₂ | OH |
| 2 | C₆H₅—CH₂ | NH₂ |
| 2 | CH₂CH₂SCH₃ | OH |
| 3 | CH₂CH₂SCH₃ | OH |
| 3 | CH₂CH₂SCH₃ | N(CH₃)₂ |
| 2 | CH₂-4-(or 5)-Im | NH₂ |
| 2 | (CH₂)₃NHC(=NH)NH₂ | OH |
| 3 | (CH₂)₃NHC(=NH)NH₂ | OH |
| 2 | (CH₂)₃NHC(=NH)NH₂ | NH₂ |

EXAMPLE XIX

Acid addition salt formation

The appropriate 11-deoxoglycyrrhetinamide of formulae I or II which contains a basic group is dissolved in a suitable solvent, e.g., chloroform, methylene chloride, ethanol, and an excess of the appropriate acid added to the solution. The product, if insoluble in the solvent, is recovered by filtration. The product, if soluble in the solvent, is recovered by addition of a non-solvent for the salt, e.g., ether, or by evaporation of the solvent under reduced pressure.

In this manner, the hydrochloride, hydrobromide, tartrate, citrate, acetate, propionate, butyrate, gluconate, benzoate, succinate, malate, maleate, fumarate, nitrate, sulfate, and oxalate salts of the products of Examples II–XVIII which contain a basic group are prepared.

EXAMPLE XX

Metal salt formation

A mixture (solution or suspension) of the appropriate 11-deoxoglycyrrhetinamide compound of formulae I or II in water is treated with one equivalent of the appropriate metal hydroxide for each carboxy group present. The mixture is stirred at room temperature until reaction is complete and the salt recovered by removal of the water, e.g., by freezedrying.

In this manner, the sodium and potassium salts of those compounds of Examples VIII, and XI–XVIII having at least one carboxy group are prepared.

PREPARATION A

3β-acyloxy-18β-olean-12-en-30-oic acids
(via acid anhydride)

The procedure of Example I–B is repeated but using the appropriate acid anhydride in place of acetic anhydride to give the following 3β-acyl derivatives of 11-deoxoglycyrrhetinic acid:

propionyl
butyryl
isobutyryl
valeryl
caproyl

PREPARATION B

3β-acyloxy-18β-olean-12-en-30-oic acids
(via acid chloride)

A mixture of 11-deoxoglycyrrhetinic acid (0.1 mM.), the appropriate acyl chloride (10 mM.) and pyridine (10 mM.) is heated on a water bath for 1.5 hours and then poured into water. The aqueous mixture is extracted with ether and the ether solution washed successively with dilute aqueous sodium hydroxide and hydrochloric acid and then dried (Na₂SO₄). Evaporation of the solvent affords the product which is recrystallized from a suitable solvent such as methanol-chloroform.

The following 3β-acyl derivatives are thus prepared:

acetyl
propionyl
caproyl

PREPARATION C

3β-acyloxy-18β-olean-12-en-30 oyl chlorides

The 3β-acyl derivatives of Preparations A and B derived from monocarboxylic acids are converted to their acid chlorides by the procedure of Example I–C.

PREPARATION D

3β-(γ-carbomethoxybutyryloxy)-18β-olean-12-en-30-oyl chloride

To a solution of 11-deoxoglycyrrhetinic acid (4.86 g.) in pyridine (20 ml.) is added γ-carbomethoxybutyryl chloride (3 ml.) in pyridine (50 ml.). The reaction mixture is allowed to stand for four days and is then poured into water (100 ml.). The aqueous mixture is extracted with ether (3× 250 ml.) and the combined ethereal extracts dried over magnesium sulfate. Evaporation of the ether gives the crude product which is recrystallized to constant melting point from methanol-water.

What is claimed is:

1. A compound having the formula:

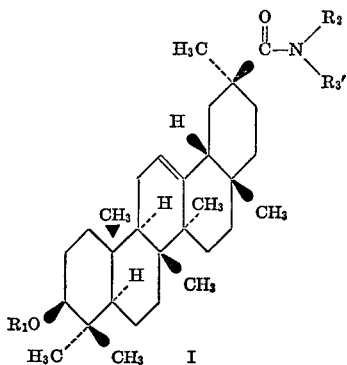

wherein $R_1$ is selected from the group consisting of hydrogen, alkanoyl having from two to six carbon atoms, ω-carboxyalkanoyl having a total of from four to five carbon atoms;

$R_2$ is selected from the group consisting of hydrogen, alkyl having from one to four carbon atoms, hydroxyalkyl having from two to four carbon atoms;

$R_2$ and $R_3'$ when taken together with the nitrogen atom to which they are attached are selected from the group consisting of piperazino, N-alkylpiperazino having from one to four carbon atoms in the alkyl moiety, N-ω-(hydroxyalkyl)piperazino having from two to four carbon atoms in the alkyl moiety, N-(carbalkoxy)piperazino having from one to four carbon atoms in the alkoxy moiety; and the pharmaceutically-acceptable alkali metal salts of those compounds having at least one carboxy group; and the pharmaceutically-acceptable acid addition salts of those compounds having a basic group.

2. An 11-deoxoglycyrrhetinic acid derivative according to claim 1, formula I.

3. A compound according to claim 2 wherein $R_1$ is hydrogen and $NR_2R_3'$ is N-(ω-hydroxyalkyl)piperazino.

4. A compound according to claim 2 wherein $R_1$ is alkanoyl, and —$NR_2R_3'$ is N-(ω-hydroxyalkyl)piperazino.

5. A compound according to claim 2 wherein $R_1$ is ω-carboxyalkanoyl and $NR_2R_3'$ is 4-(ω-hydroxyalkyl)piperazino.

6. 1-(3β-hydroxy-18β-olean-12-en-30-oyl)-4-(2-hydroxyethyl)piperazine, a compound according to claim 3 wherein $NR_2R_3'$ is 4-(2-hydroxyethyl)piperazino.

7. 1-(3β-acetoxy-18β-olean-12-en-30-oyl)-4-(2-hydroxyethyl)piperazine, a compound according to claim 4 wherein $R_1$ is acetyl and —$NR_2R_3'$ is 4-(2-hydroxyethyl)piperazino.

8. 1-(3β-carboxypropionyloxy-18β-olean-12-en-30-oyl)-4-(2-hydroxyethyl)piperazine, a compound according to claim 5 wherein $R_1$ is carboxypropionyloxy and $NR_2R_3'$ is 4-(2-hydroxyethyl)piperazino.

References Cited

UNITED STATES PATENTS 3,412,084  11/1968  Turner et al. ____ 260—268 PC
3,523,942  8/1970   Holden _____ 260—268 PC

OTHER REFERENCES

Turner et al., Chem. Abstr., vol. 74, col. 100243c (1971), abstracting German 2,034,694.

Turner et al., Chem. Abstr., vol. 73, col. 131170k (1970), abstrating German 2,001,906.

Turner, Chem. Abstr. vol. 74, col. 88175x (1971), abstracting German 2,027,577.

DONALD G. DAUS, Primary Examiner

U.S. Cl. X.R.

260—247.2 A, 293.56, 309, 326.14, 326.3, 349, 529.9, 447, 468.5, 557 B; 424—243, 250, 269, 320

UNITED STATES PATENT OFFICE
CERTIFICATE OF CORRECTION

Patent No. 3,814,766  Dated June 4, 1974

Inventor(s) Dr. Hans-Jurgen E. Hess and Dr. Roger P. Nelson

It is certified that error appears in the above-identified patent and that said Letters Patent are hereby corrected as shown below:

Column 4, line 60, after "or" insert -- ethyl ester --.

Column 8, line 14, "46.6% should read -- 45.6% --.

Signed and sealed this 8th day of October 1974.

(SEAL)
Attest:

McCOY M. GIBSON JR.  C. MARSHALL DANN
Attesting Officer  Commissioner of Patents